United States Patent [19]
Fredheim

[11] Patent Number: 5,259,597
[45] Date of Patent: Nov. 9, 1993

[54] TENSION RELIEVING DEVICE FOR SEISMIC CABLES

[75] Inventor: Robert Fredheim, Alversund, Norway

[73] Assignee: GECO A.S., Stavanger, Norway

[21] Appl. No.: 842,986

[22] Filed: Feb. 28, 1992

[30] Foreign Application Priority Data

Mar. 14, 1991 [NO] Norway .................................. 911024

[51] Int. Cl.$^5$ ........................... G01V 1/38; F16F 1/00
[52] U.S. Cl. ........................................ 267/69; 367/20
[58] Field of Search .................... 267/69; 367/20, 106, 367/154; 114/205, 215; 174/101.5, 131 R

[56] References Cited

U.S. PATENT DOCUMENTS

| | | | |
|---|---|---|---|
| 4,641,288 | 2/1987 | McGowan et al. | 367/20 |
| 4,912,816 | 4/1990 | Brandt | 24/129 A |
| 5,062,085 | 10/1991 | Andrews, Jr. | 367/154 |

Primary Examiner—Robert J. Oberleitner
Assistant Examiner—Chris Schwartz
Attorney, Agent, or Firm—Jacobson, Price, Holman & Stern

[57] ABSTRACT

A tension relieving device for seismic cables or cable sections having a stretch element (4) which is passed in loops between two end pieces (1,2) designed to be attached to end contact pieces on the seismic cable. The stretch element (4) is passed in at least two loops, with at least four lengths (8) in the longitudinal direction of the device, in that the loops are passed through holes (6) and curved, tubular guides (12) in the end pieces. On their lengths (8) the stretch elements (4) are equipped with stoppers (10) with diameters greater than the holes (6) in the end pieces (1,2). In the central area of the end pieces (1,2) between the stretch element guides a preferably central opening (9) is made to allow the cable's wires etc. to pass through.

16 Claims, 1 Drawing Sheet

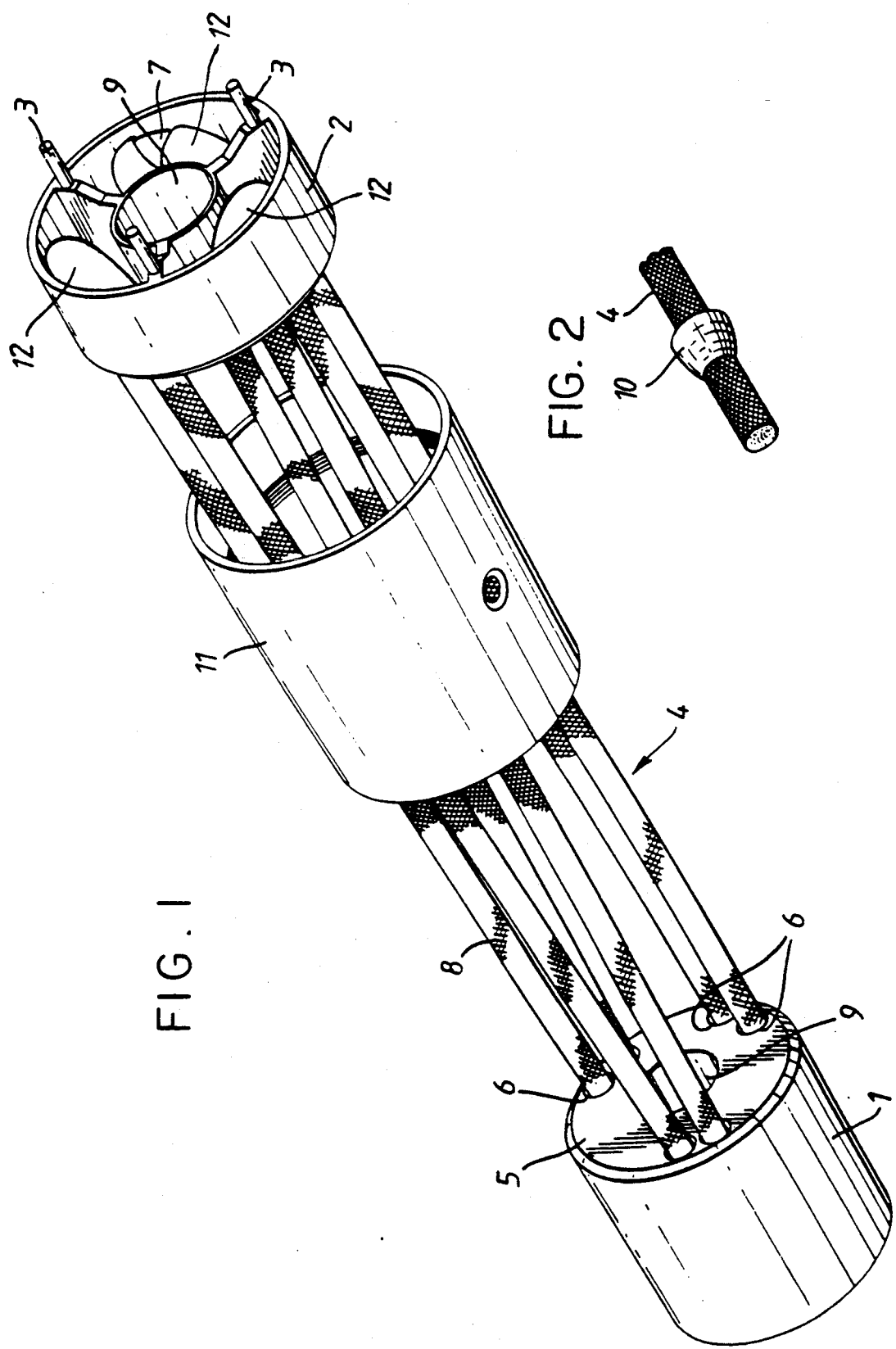

– 5,259,597 –

TENSION RELIEVING DEVICE FOR SEISMIC CABLES

BACKGROUND OF THE INVENTION

The invention concerns a tension relieving device for cables or cable sections and particularly seismic cables (streamers) which are towed behind a vessel, where a stretch element is passed in a loop between two end pieces which are designed to be attached to end contact pieces on the seismic cable.

When cables, e.g. seismic cables, i.e. so-called streamers, are towed in the water behind a seismic vessel, the cables are exposed to tension stresses, which not only exert a strain on the streamer in the longitudinal direction, but which can also cause oblique loading in relation to the streamer's longitudinal direction. Such stresses also occur when the streamer is reeled in on the cable reel on board the seismic vessel. If measures are not taken to compensate for such tension stresses a break can easily occur in the cable and the cable's contacts can become deformed, giving rise to points of leakage in the cable. The load-carrying structures with their wires can even be broken or worn away.

In order to counteract such faults and unfortunate effects, tension relieving devices are normally inserted in the seismic cable. A device of this kind is described in U.S. Pat. No. 4,641,288 where between two end elements is attached a band which due to its flexibility should be able to absorb loads, even in other directions than in the cable's longitudinal direction. The tension relieving device in accordance with the U.S. patent will, however, not work in all planes, due in part to the termination in the ends where metal pins are used. There will be no compensation for an oblique load in the same direction as the axis of the pins. Moreover, with the device in accordance with the said U.S. patent problems will be encountered with lead-through of the various wiring components required by the streamer cable.

BRIEF SUMMARY OF THE INVENTION

The object of the present invention is to provide a tension relieving device which does not have the disadvantage of the device described in U.S. Pat. No. 4,641,288 and which moreover provides a means of stress relief which works independently of the angle of loading.

A further object of the invention is to provide a device which in the case of a break also prevents the streamer cable or elements thereof from becoming completely disconnected, i.e. the device is equipped with a safety device which relieving device of the invention which is particulary suitable for installation after the so-called "lead-in" section of a towed cable and especially where the streamer is deployed in a lateral direction in relation to the towing vessel's longitudinal axis, i.e. where there are "breakpoints" in the towing cable. The device can also be installed with advantage in several sections behind one another in a streamer cable in order to give it sufficient flexibility.

As elements in the device it is advantageous to use rope of a plastic material such as nylon rope, but other materials having qualities of plastic can also be suitable, such as polyamide, polyester, kevlar, etc.

BRIEF DESCRIPTION OF THE DRAWING

The invention will now be described in more detail in the following section with reference to the accompanying drawing wherein:

FIG. 1 is a perspective view of an embodiment of the device according to the

FIG. 2 is a perspective view of part of a stretch element of FIG. 1 with a stopper thereon.

DETAILED DESCRIPTION

The device according to the invention consists of two end pieces 1 and 2 each of which can be screwed or welded to an end contact piece or streamer plug on the seismic cable and are equipped with pins 3 to prevent rotation between the end piece and the plug. The device is designed for the insertion of a tension relieving device in a towed cable, e.g. at the transition from a so-called "lead-in" section which comes from a seismic towing vessel, to a streamer cable which follows the tension relieving device. When several streamers are towed in parallel, most of the streamers will be pulled out to the side by means of suitable guiding devices, so that in this area there is a breakpoint in the towline and thus oblique loads are exerted on the towline. Such oblique loads are intended to be absorbed by the tension relieving device and distributed in such a way that the loads follow the direction of the towline. Further tension relieving devices of this kind can be installed at regular intervals along the streamer cables in order to compensate for any loads and to absorb tension stresses at the joints. As already mentioned the device according to the invention is based on two end pieces 1, 2 between which is passed a stretch element which is generally described by 4 and which, e.g., can be a nylon rope of strong quality which, e.g., can hold a pull/stretch load in the order of 10 tons. This rope or stretch element 4 is passed in an endless path back and forth between the end pieces 1 and 2. In these end pieces is installed a plate element 5 with lead-through holes indicated by 6, as illustrated in FIG. 1 in connection with end piece 1. These holes 6 are arranged in pairs. Between the holes in each pair, on the side facing away from the respective other end piece, is placed a curved tubular guide 12, which may be attached in some suitable manner to the end piece, path designed to lead the rope 4 in an even curvature from the one hole 6 of the pair to the other. In this way an endless rope can be passed back and forth between the end pieces 1 and 2, since the ropes inside the end pieces form a curve 7 and run backwards and forwards in lengths indicated by 8. In the illustrated embodiment six such lengths 8 are shown arranged in three pairs which are symmetrically distributed around a central opening 9 in the end pieces. Wires and other streamer cable equipment can then be led through this opening or central hole 9, without these coming into conflict with the tension relieving element. The symmetrical positioning of the stretch elements or lengths 8 means that the loads, regardless of from which oblique direction they are exerted, will be absorbed equally and due to the endless construction of the rope 4 the tension stress which comes in obliquely from one direction will be equally distributed between all the stretch elements, thus giving an even distribution of the load.

In the event of a break in the stretch element 4, there will be a risk of loosing the streamer cable or parts of it. In order to avoid this danger, some of the stretches have been fitted with a thickening 10, shown in FIG. 2, which can be designed in an appropriate manner either by clamping on a clip or by an integrated modelling of the rope part, the only thing that matters being that this thickening, which can be indicated as a stopper 10, has a diameter greater than the holes 6 in the end pieces. In the event of a break in a length 8, the stretch element will therefore only slide out until the body of the stoppers meets the edge of the holes 6. Another embodiment of this kind of safety device with stopper 10 can be as a separate element, i.e. as an intermediate sleeve 11 as illustrated in FIG. 1. Inside this intermediate sleeve are installed one or more plate elements with holes which have the same dimension as the holes 6, through which the lengths 8 are passed in such a way that the stoppers 10 will press against the integrated plate element, or between several such plate elements, thus ensuring minimum extension of the stretch element 4. The first mentioned embodiment, however, is the preferred one.

Many modifications will be possible within the scope of the invention. Thus only two loops can also be used instead of three as shown in the figure, even though three loops have been found to be most expedient for reasons of symmetry. It may also be possible to use more than three loops in cases where the tension stresses can be excessive. As mentioned, the rope in the stretch element can be of a plastic material such as nylon, polyamide, polyester or kevlar, but steel cable can also be applicable.

Thus many modifications are possible within the scope of the invention.

I claim:

1. A tension relieving device or seismic cables an sections of seismic cables comprising:
    two end pieces in relative spaced relationship with respect to each other, each of said end pieces having a hollow interior portion and being connectable to end contact pieces on seismic cables and sections of seismic cables for connecting two end contact pieces together with said tension relieving device therebetween;
    a plurality of holes in each of said end pieces communicating with said hollow interior portion thereof;
    a plurality of curved tubular guide members in each of said end pieces;
    a stretch element extending through said holes and said tubular guide members in each end piece to form at least two loops and at least four lengths of said stretch element between said spaced end pieces;
    a plurality of stoppers on said stretch element having outer diameters greater than the diameters of said holes so that said stoppers cannot pass through said holes and prevent said stretch element from passing through said holes when at least one of said stoppers engages against at least one of said end pieces at at least one of aid holes; and
    an opening in a central area of each of said end pieces between said tubular guide members thereof to facilitate passing wires of said seismic cables and sections thereof through said hollow interior portion.

2. The tension relieving device as claimed in claim 1 wherein:
    said stretch element comprises three loops forming six lengths extending between said two end pieces.

3. The tension relieving device as claimed in claim 2 wherein:
    said stretch element comprises a rope of material selected from the group consisting of nylon, polyamide, polyester, kevlar and steel.

4. The tension relieving device as claimed in claim 3 wherein:
    said stretch element comprises an endless rope.

5. The tension relieving device as claimed in claim 4 wherein:
    each of said two end pieces further comprises a cylindrical member and a plate member extending substantially radially on and connected to said cylindrical member;
    said holes comprise a plurality of pairs of holes; and
    a tubular guide member is provided for each pair of holes.

6. The tension relieving device as claimed in claim 2 wherein:
    said stretch element comprises an endless rope.

7. The tension relieving device as claimed in claim 6 wherein:
    each of said two end pieces further comprises a cylindrical member and a plate member extending substantially radially on and connected to said cylindrical member;
    said holes comprises a plurality of pairs of holes; and
    a tubular guide member is provided for each pair of holes.

8. The tension relieving device as claimed in claim 2 wherein:
    each of said two end pieces further comprises a cylindrical member and a plate member extending substantially radially on an connected to said cylindrical member;
    said holes comprise a plurality of pairs of holes; and
    a tubular guide member is provided for each pair of holes.

9. The tension relieving device as claimed in claim 3 wherein:
    each of said two end pieces further comprises a cylindrical member and a plate member extending substantially radially on and connected to said cylindrical member;
    said holes comprise a plurality of pairs of holes; and
    a tubular guide member is provided for each pair of holes.

10. The tension relieving device as claimed in claim 1 wherein:
    said stretch element comprises a rope of material selected from the group consisting of nylon, polyamide, polyester, kevlar and steel.

11. The tension relieving device as claimed in claim 10 wherein:
    said stretch element comprises an endless rope.

12. The tension relieving device as claimed in claim 11 wherein:
    each of said two end pieces further comprises a cylindrical member and a plate member extending substantially radially on and connected to said cylindrical member;
    said holes comprise a plurality of pairs of holes; and
    a tubular guide member is provided for each pair of holes.

13. The tension relieving device as claimed in claim 10 wherein:
    each of said two end pieces further comprises a cylindrical member and a plate member extending substantially radially on and connected to said cylindrical member;

said holes comprise a plurality of pairs of holes; and a tubular guide member is provided for each pair of holes.

14. The tension relieving device as claimed in claim 1 wherein:

said stretch element comprises an endless rope.

15. The tension relieving device as claimed in claim 14 wherein:

each of said two end pieces further comprises a cylindrical member and a plate member extending substantially radially on and connected to said cylindrical member;

said holes comprise a plurality of pairs of holes; and a tubular guide member is provided for each pair of holes.

16. The tension relieving device as claimed in claim 1 wherein:

each of said two end pieces further comprises a cylindrical member and a plate member extending substantially radially on and connected to said cylindrical member;

said holes comprise a plurality of pairs of holes; and a tubular guide member is provided for each pair of holes.

* * * * *